US012754992B2

(12) United States Patent
Benedict et al.

(10) Patent No.: US 12,754,992 B2
(45) Date of Patent: Oct. 6, 2026

(54) VALIDATED ACCESS OF AN ELECTRONIC MODULE

(71) Applicant: HEWLETT PACKARD ENTERPRISE DEVELOPMENT LP, Spring, TX (US)

(72) Inventors: Melvin K. Benedict, Magnolia, TX (US); Eric L. Pope, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 77 days.

(21) Appl. No.: 18/810,635

(22) Filed: Aug. 21, 2024

(65) Prior Publication Data

US 2026/0057060 A1 Feb. 26, 2026

(51) Int. Cl.
*G06F 21/44* (2013.01)
*H04L 9/30* (2006.01)

(52) U.S. Cl.
CPC ................ *G06F 21/44* (2013.01); *H04L 9/30* (2013.01)

(58) Field of Classification Search
CPC ................................ G06F 21/44; G06F 21/57
See application file for complete search history.

(56) References Cited

U.S. PATENT DOCUMENTS 7,613,915 B2 * 11/2009 Srinivasan ............ H04L 9/0869 713/1
2013/0346760 A1 * 12/2013 Ignatchenko ....... H04L 63/0823 726/17
2019/0052622 A1 * 2/2019 Karroumi ............ H04L 9/3247
2026/0057060 A1 * 2/2026 Benedict ................. G06F 21/44

OTHER PUBLICATIONS

DMTF, Document Identifier: DSP0239, Version: 1.7.2, Management Component Transport Protocol (MCTP) IDs and Codes, Date: Apr. 30, 2021 (16 pages).
DMTF, Document Identifier: DSP0274, Version: 1.3.0, Security Protocol and Data Model (SPDM) Specification, Date: Jun. 28, 2023 (263 pages).
DMTF, Document Identifier: DSP0275, Version: 1.0.1, Security Protocol and Data Model (SPDM) over MCTP Binding Specification, Date: Mar. 28, 2022 (10 pages).
DMTF, Document Identifier: DSP0276, Version: 1.0.0a, Secured MCTP Messages over MCTP Binding Specification, Date: Mar. 18, 2019 (13 pages).
Wikipedia, Management Component Transport Protocol downloaded Aug. 13, 2024 (3 pages).
Wikipedia, Serial presence detect, downloaded Aug. 2, 2024 (24 pages).
Wikipedia, Vital Product Data, downloaded Aug. 8, 2024 (2 pages).

* cited by examiner

*Primary Examiner* — Ponnoreay Pich
(74) *Attorney, Agent, or Firm* — Trop, Pruner & Hu, P.C.

(57) ABSTRACT

In some examples, a compute platform includes an electronic module having a memory storing platform data, and an attribute certificate containing a platform data measurement value based on portions of the platform data stored in respective memory regions of the memory in the electronic module. A processor performs validated access of the electronic module based on performing an initialization exchange with the electronic module, obtaining a platform data measurement value based on the platform data in the electronic module, and authenticating the platform data in the electronic module based on the obtained platform data measurement value and the platform data measurement value contained in the attribute certificate.

16 Claims, 9 Drawing Sheets

VALIDATED ACCESS OF AN ELECTRONIC MODULE

BACKGROUND

A compute platform includes various electronic components, such as processors, memory modules, input/output (I/O) devices, management controllers, and other electronic components. The compute platform can store data used for configuring, initializing, and managing the compute platform.

BRIEF DESCRIPTION OF THE DRAWINGS

Some implementations of the present disclosure are described with respect to the following figures.

Figure 1:
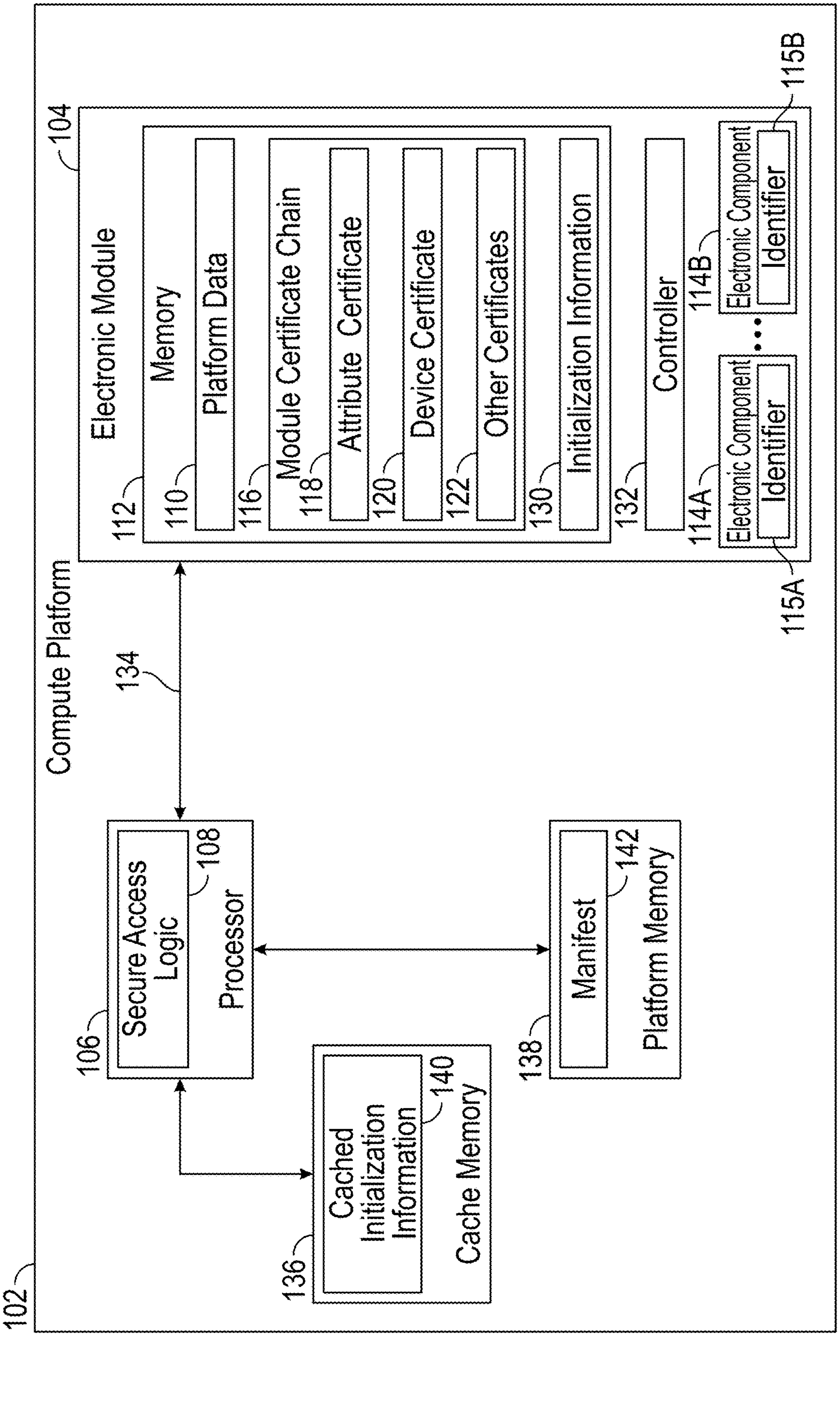
FIG. 1 is a block diagram of a compute platform according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Data for configuring, initializing, managing, and/or describing a compute platform can be stored in one or more data structures on the compute platform. As examples, a memory module (DIMM) can store data within serial presence detect (SPD) data, which can indicate various properties associated with the memory module, such as timing parameters for the memory module, a manufacturer of the memory module, a serial number for the memory module, and/or other information about the memory module. Further, the compute platform may include field replaceable units (FRUs), which are modules that can be replaced in the field. An FRU can also store FRU data, which can include initialization parameters used to initialize the FRU, a serial number for the FRU, a model number of the FRU, version information of the FRU, and/or other information about the FRU. Additionally, the compute platform may store product data, such as vital product data including information for hardware and machine-readable instructions (including software and/or firmware) in the compute platform. Other examples of product data include a hardware bill of materials (BOM) that includes information for hardware components, a software BOM that includes information for software components of the electronic module, or other forms of product data. The product data may include part numbers, serial numbers, change information, and/or other information. The product data may be stored in one or more electronic components of the compute platform, such as on a main circuit board (also referred to as a "mother board"), or other electronic components.

More generally, data for configuring, initializing, managing, and/or describing one or more electronic modules in a compute platform may be referred to as "platform data." The platform data is accessible to multiple entities in the compute platform, including system firmware (e.g., Basic Input/Output System (BIOS) code), an operating system (OS), an application program, and/or a hardware component such as a management controller (e.g., a baseboard management controller (BMC)), a security processor (e.g., a Trusted Platform Module (TPM)), or another hardware component. If the platform data is corrupted, then an entity using the platform data may not operate in the expected manner. The platform data may be corrupted due to any of the following reasons: data errors, modification by malware or another attacker, an incorrect version of the platform data is used, or for any other reason. corrupted platform data can lead to errors in the initialization, configuration, or management of electronic components. Corrupted platform data may also allow an attacker to gain unauthorized access to the compute platform, which raises security issues.

Additionally, an electronic module in the compute platform may be subject to unauthorized modification. The modified electronic module may perform malicious actions, may enable malicious actions, or may not perform in the intended manner. In an example, an unauthorized user may add a new component, remove an existing component of the electronic module, or replace an existing electronic component on the electronic module with a different electronic component. As another example, when repairing or performing maintenance of an electronic module, a technician or another user may mistakenly add a new component, remove an existing component, or replace an existing component with a different component on the electronic module.

Further issues associated with data communications include one or more of the following: validating data accessed (read or written) at a target electronic module to ensure that the target electronic module is an expected entity, checking that transferred data has not been tampered with (such as an actor interposed between a requester and a responder), and checking that the data accessed is current (fresh) (i.e., the data accessed is not a replay of prior data that is no longer valid). If not addressed, any of the foregoing issues can raise security concerns in which an unauthorized entity may provide invalid data, or tamper with data.

In accordance with some implementations of the present disclosure, validated access of an electronic module includes performing any or some combination of the following: (1) authenticate platform data of an electronic module in a compute platform, (2) authenticate the electronic module based on identifiers of electronic components in the electronic module, or (3) validate (also referred to as attest) communications between a requester and the electronic module. To authenticate the platform data, a requester obtains a platform data measurement value based on the platform data in the electronic module, and validates the platform data in the electronic module based on the obtained platform data measurement value and "golden" platform data measurement value contained in an attribute certificate that is part of a certificate chain of the compute platform.

To authenticate the electronic module, the requester obtains a component measurement value based on the identifiers of the components in the electronic module, and verifies that the components in the electronic module have not been modified based on the obtained component measurement value and a "golden" component measurement value in the attribute certificate.

To validate communications between the requester and the electronic module, the requester can initiate a challenge procedure in which the requester sends a challenge to the electronic module, and the electronic module responds with a signed challenge response. The requester can extract a message digest from the signed challenge response, and the requester can use the extracted message digest to validate communications of data between the requester and the electronic module.

As used here, a "requester" can refer to a hardware component or a program that is able to perform any or some combination of 1) authenticating platform data of an electronic module, (2) authenticating the electronic module based on identifiers of electronic components in the electronic module, or (3) validating communications between a requester and the electronic module. For example, the requester can include a processor, a security processor such as a TPM, a management controller such as a BMC, or any other hardware component. Alternatively, the requester can include system firmware, an OS, a driver, or another type of program.

FIG. 1 is a block diagram of a compute platform 102, which can be implemented using one or more computers. The compute platform 102 includes an electronic module 104, which can be implemented using one or more discrete components. In some examples, the electronic module 104 can include a memory module, such as a dual in-line memory module (DIMM) or another type of memory module. In further examples, the electronic module 104 can include an FRU or any other type of electronic module. More generally, the electronic module 104 can include any assembly of electronic components. Although just one electronic module is depicted in FIG. 1, the compute platform 102 may include multiple electronic modules subject to validated access according to some examples of the present disclosure.

The compute platform 102 further includes a processor 106 that executes a secure access logic 108 (implemented with machine-readable instructions) for performing validated access of the electronic module 104 based on authenticating platform data 110 stored in a memory 112 of the electronic module 104, authenticate electronic components 114A to 114B in the electronic module 104, and validate communications between the processor 106 and the electronic module 104. Although two electronic components are depicted in FIG. 1, in other examples, a different quantity of (one or more) electronic components can be included in the electronic module 104.

In some examples, the memory 112 can include a persistent memory, which can be implemented using a flash memory device, an electrically erasable and programmable read-only memory (EEPROM) device, or another type of nonvolatile memory device. A nonvolatile memory device is able to maintain its stored data even if power were removed from the memory device.

In examples where the electronic module 104 is a memory module, the electronic components 114A to 114B are memory devices in the memory module. In examples where the electronic module 104 is an FRU, the electronic components 114A to 114B are components of the FRU. An FRU is an electronic assembly that can be quickly and easily removed from the compute platform 102, and potentially replaced with another FRU. An FRU can be a circuit board, a power supply, or any other type of electronic assembly.

Figure 3:
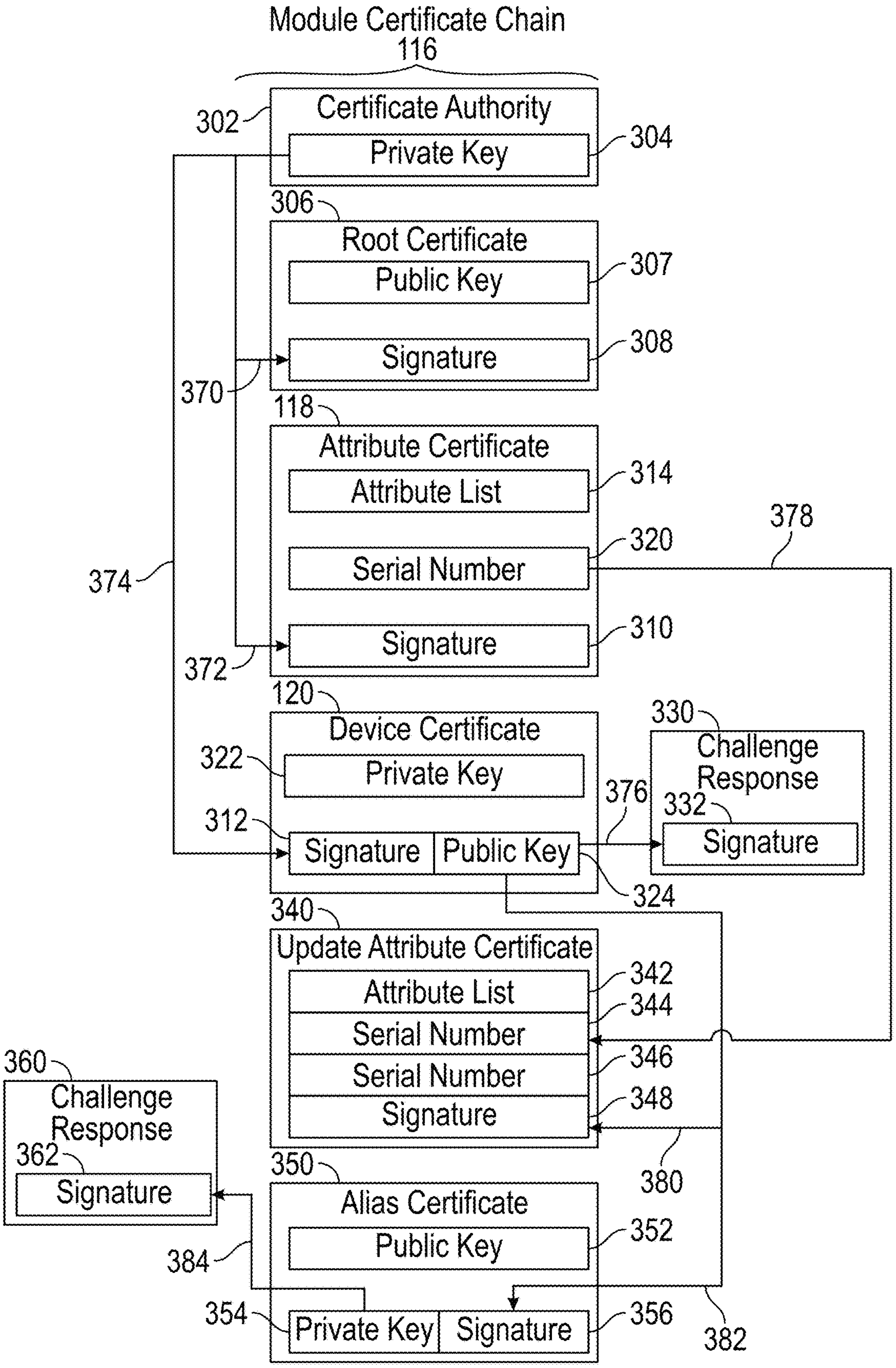
FIG. 3 is a block diagram of a module certificate chain for an electronic module, according to some examples.

The memory 112 also stores a module certificate chain 116, which includes a chain of certificates for the electronic module 104. Further details of an example of the module certificate chain 116 are shown in FIG. 3. The module certificate chain 116 includes an attribute certificate 118 (also referred to as a module certificate), a device certificate 120 (also referred to as a leaf certificate), and other certificates 122.

The memory 112 also stores initialization information 130 that includes various initialization parameters for initializing an exchange between the secure access logic 108 executed on the processor 106 and the electronic module 104.

The electronic module 104 further includes a controller 132 for performing various tasks of the electronic module 104. For example, if the electronic module 104 is a memory module, the controller 132 can include a media controller that responds to commands from a memory controller (not shown) by asserting signals for accessing memory devices. If the electronic module 104 is an FRU, then the controller 132 is an FRU controller.

A communication link 134 connects the processor 106 and the electronic module 104. The communication link 134 can include a management link, such as an Improved Inter-Integrated Circuit (13C) bus, a Serial Peripheral Interface (SPI) bus, or any other type of management link. In some examples, a transport protocol such as a Management Component Transport Protocol (MCTP) can be used for messages exchanged over the communication link 134. MCTP is a protocol defined by the Distributed Management Task Force (DMTF) to support management-related communications between electronic components. In other examples, other types of protocols relating to management-related communications can be used, such as the Intelligent Platform Management Interface (IPMI) protocol, or another protocol.

In some examples, the validated access of the electronic module 104 by the secure access logic 108 or any other requester can be according to the Security Protocols and Data Models (SPDM) standard promulgated by the DMTF's SPDM Working group. The SPDM standard enables authentication, attestation, and key exchange to assist in providing infrastructure security.

The processor 106 can include any or some combination of the following: a central processing unit (CPU), a management controller such as a BMC, a security processor such as a TPM, or any other type of processor.

The processor 106 has access to a cache memory 136. Although shown as separate from the processor 106, in some examples, the cache memory 136 can be part of the processor 106. The cache memory 136 is implemented using one or more relatively fast memory devices to store data that can be quickly accessed by the processor 106. The access speed of the cache memory 136 is faster than the access speed of another memory in the compute platform 102, such as a platform memory 138. The platform memory 138 can include the main memory of the compute platform 102, or alternatively, the platform memory 138 may be part of a management controller (e.g., a BMC), or another component.

The secure access logic 108 can store a portion of the initialization information 130 in the cache memory 136 as cached initialization information 140. The cached initialization information 140 allows a requester (e.g., a program executed on the processor 106) to skip an initialization exchange that obtains initialization parameters of the initialization information 130 from the electronic module 104. In this way, the requester is able to more quickly verifiably access data of the electronic module 104.

The platform memory 138 stores a manifest 142. In some examples, the manifest 142 is defined by the Joint Electron Device Engineering Council (JEDEC). In other examples, the manifest 142 can be according to other protocols, whether standardized, open source, or proprietary.

The manifest 142 can identify memory regions of the memory 112 at which portions of the platform data 110 ("platform data portions) are stored. A measurement of the platform data portions is performed based on the identified memory regions in the manifest 142. The manifest 142 can also identify an order of the platform data portions. This identified order defines how the platform data portions are to be concatenated (the order of the platform data portions in this concatenation). A measurement is then applied on this concatenated sequence of platform data portions.

The manifest 142 also identifies the electronic components 114A to 114B that are part of the electronic module 104, and an order in which measurements of component identifiers 115A to 115B of the electronic components 114A to 114B are to be measured. The component identifiers 115A to 115B are stored in respective storage elements in the electronic components 114A to 114B. An example of a component identifier is a serial number of an electronic component. In other examples, other types of identifiers (e.g., universal unique identifiers or UUIDs) of electronic components can be used. The component identifiers 115A to 115B are concatenated according to the identified order in the manifest 142, and a measurement is applied on this concatenated sequence of component identifiers.

A measurement of an input value (such as platform data portions or component identifiers) can refer to applying a function on the input value to derive a measurement value. In some examples, the function includes a cryptographic hash function, such as a Message-Digest (MD) Algorithm function (e.g., MD4 or MD5 function), a Secure Hash Algorithm (SHA) function (e.g., SHA-1, SHA-2, or SHA-3), or any other type of cryptographic hash function. In other examples, other types of functions can be applied. A measurement value derived from applying a measurement on the platform data portions is referred to as a "platform data measurement value," and a measurement value derived from applying a measurement on the component identifiers 115A to 115B is referred to as a "component measurement value."

The secure access logic 108 can compare the platform data measurement to a golden measurement value included in the attribute certificate 118 for authenticating the platform data 110. Similarly, the secure access logic 108 can perform the component measurement value to a golden component measurement value included in the attribute certificate 118 for authenticating the electronic components 114A to 114B of the electronic module 104. A "golden" measurement value refers to a value derived at a secure facility (such as at a facility of a manufacturer of the electronic module 104) based on the platform data portions and the component identifiers 115A to 115B at a time when the platform data 110 and the electronic components 114A to 114B have not been tampered with, which is likely the case when the electronic module 104 is first manufactured or assembled.

For example, a computer system at the secure facility can apply a measurement of the platform data portions and apply a measurement of the component identifiers 115A to 115B to derive the golden platform data measurement value and the golden component measurement value, respectively. The computer system can store the golden platform data measurement value and the golden component measurement value in the attribute certificate 118.

In addition to authenticating the platform data 110 and the electronic components 114A to 114B, the secure access logic 108 can validate communications between the processor 106 and the electronic module 104 based on public and private keys in the device certificate 120. The public and private keys form a public-private key pair for the electronic module 104. The public key is accessible by the processor 106, while the private key remains stored in the memory 112 of the electronic module 104 and is not shared with an entity outside the electronic module 104.

Figure 2:
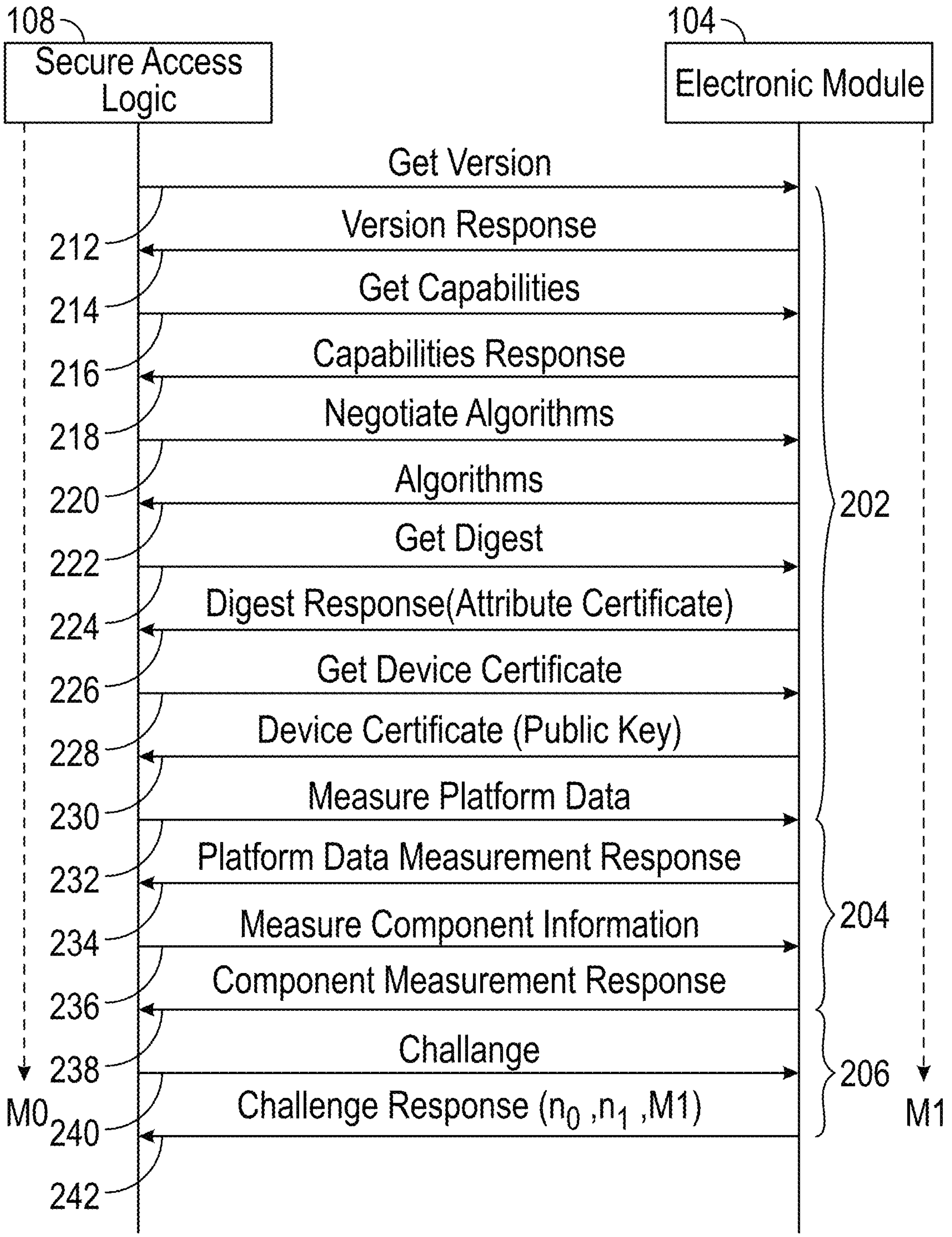
FIG. 2 is a flow diagram of a process performed by a secure access logic and an electronic module for validated access of the electronic module, according to some examples.

FIG. 2 is a flow diagram of a process performed by the secure access logic 108 (a requester) and the electronic module 104 (a responder) for validated access of the electronic module 104. In some examples, the process of FIG. 2 may be performed after each power cycle of the compute platform 102, or more generally, when the compute platform 102 starts from a disabled state (e.g., power off state, low power state, or any other state in which the compute platform 102 is not operational). Messages exchanged in FIG. 2 may be according to the SPDM standard and may be transferred over the communications link 134 of FIG. 1 using the MCTP transfer protocol.

The process of FIG. 2 includes an initialization exchange 202, a measurement exchange 204, and a communication validation exchange 206. Although FIG. 2 shows each the initialization exchange 202, the measurement exchange 204, and the communication validation exchange 206 as including an exchange of specific example messages, in other examples, the initialization exchange 202, the measurement exchange 204, and the communication validation exchange 206 can include other messages.

The initialization exchange 202 starts with a Get Version request sent (at 212) from the secure access logic 108 to the electronic module 104. The Get Version request is a request for version information of the platform data 110. More specifically, for example, if the platform data 110 includes SPD data, then the version information (e.g., a version number) can refer to a version of SPD used by the electronic module 104. The version information for the platform data 110 allows the secure access logic 108 to determine what version of the platform data 110 is stored in the electronic module 104. The controller 132 in the electronic module 104 retrieves the version information from the initialization information 130 stored in the memory 112. The electronic module 104 sends (at 214) a Version Response containing the version information to the secure access logic 108.

In the initialization exchange 202, the secure access logic 108 also sends (at 216) a Get Capabilities request to the electronic module 104, to seek information of capabilities supported by the electronic module 104. The capabilities can include the hashing algorithm(s) supported by the electronic module 104, and the signature algorithm(s) supported by the electronic module 104. A hashing algorithm can be used to measure information (including the platform data 110 and the component identifiers 115A to 115B) of the electronic module. A signature algorithm can be used to generate a signature (discussed further below).

The controller 132 in the electronic module 104 retrieves the capabilities information from the initialization information 130, and sends (at 218) a Capabilities Response containing the capabilities information to the secure access logic 108.

In some examples, the electronic module 104 may support multiple hash algorithms and/or signature algorithms. In such examples, the secure access logic 108 can negotiate an algorithm to use with the electronic module 104. The secure access logic 108 sends (at 220) a Negotiate Algorithms request to the electronic module 104. If the electronic module 104 supports multiple hash algorithms, then the secure access logic 108 can select a hash algorithm from among the multiple hash algorithms and include the selected hash algorithm in the Negotiate Algorithms request. Similarly, if the electronic module 104 supports multiple signature algorithms, then the secure access logic 108 can select a signature algorithm from among the multiple signature algorithms and include the selected signature algorithm in the Negotiate Algorithms request.

In response to the Negotiate Algorithms request, the electronic module 104 sends (at 222) an Algorithms response to the secure access logic 108, where the Algorithms response includes information of the selected hash algorithm and/or the selected signature algorithm.

The secure access logic 108 further sends (at 224) a Get Digest request to the electronic module 104. In response, the electronic module 104 sends (at 226) a Digest Response that contains the attribute certificate 118. The secure access logic 108 further sends (at 228) a Get Device Certificate request to the electronic module 104. In response, the electronic module 104 sends (at 230) the public portion of the device certificate 120 (including the public key of the device certificate 120) to the secure access logic 108.

After the initialization exchange 202, the secure access logic 108 in the electronic module 104 can perform the measurement exchange 204. The measurement exchange 204 can be performed in a raw measurement mode or a non-raw measurement mode. In the raw measurement mode, information (including platform data portions and the component identifiers 115A to 115B) subject to measurements is sent as raw data from the electronic module 104 to the secure access logic 108. The secure access logic 108 then applies the measurements on the received raw data. In the non-raw mode, the electronic module 104 applies the measurements on the information of the electronic module 104 (including the platform data portions and the component identifiers 115A to 115B), and sends the platform data measurement value and the component measurement value to the secure access logic 108.

In the measurement exchange 204, the secure access logic 108 sends (at 232) a Measure Platform Data request to the electronic module 104. In response, the electronic module 104 sends (at 234) a Platform Data Measurement Response to the secure access logic 108. In the raw measurement mode, the Platform Data Measurement Response includes raw data (including the platform data portions) to be measured by the secure access logic 108.

In the non-raw measurement mode, the controller 132 in the electronic module 104 applies the measurement on the platform data portions, and the Platform Data Measurement Response contains the platform data measurement value computed by the controller 132. To allow the controller 132 to measure the platform data portions in the appropriate order, a copy of the manifest 142 can also be included in the electronic module 104 (e.g., the copy of the manifest 142 can be stored in the memory 112 of the electronic module 104).

The secure access logic 108 sends (at 236) a Measure Component Information request to the electronic module 104. In response, the electronic module 104 sends (at 238) a Component Information Measurement Response to the secure access logic 108. In the raw measurement mode, the Component Information Measurement Response contains the component identifiers 115A to 115B to be measured by the secure access logic 108.

In the non-raw measurement mode, the controller 132 of the electronic module 104 applies the measurement on the component identifiers 115A to 115B, and the Platform Data Measurement Response contains the component measurement value computed by the controller 132.

The validation exchange 206 is used to validate communications between the processor 106 and the electronic module 104. The secure access logic 108 sends (at 240) a challenge to the electronic module 104. The challenge can include a nonce no, which can be a random number generated by the secure access logic 108. In response to the challenge, the controller 132 in the electronic module 104 generates and signs a challenge response, which includes the nonce no from the secure access logic 108, a nonce $n_1$ (e.g., a random number) generated by the controller 132, and a message digest M1. The message digest M1 can include specific pieces of information collected by the controller 132, such as any or some combination of the following: the version information, capabilities information, information of the selected hash algorithm and/or the selected signature algorithm, the platform data 110, the component identifiers 115A to 115B, or other pieces of information.

The electronic module 104 sends (at 242) the signed challenge response to the secure access logic 108. As discussed further below in connection with FIG. 4, the secure access logic 108 compares a message digest M0 (the expected message digest) generate by the secure access logic 108 with the message digest M1 in the signed challenge response to validate the communications between the processor 106 and the electronic module 104.

FIG. 3 is a block diagram of an example of the module certificate chain 116. In other examples, the module certificate chain 116 can include a different arrangement of certificates. Generally, a module certificate chain includes certificates that are related to one another.

The root of the module certificate chain 116 is a certificate authority 302 (CA), which is the trust anchor for the module certificate chain 116. The CA may be associated with the manufacturer of the compute platform 102 or another party. The CA 302 contains a CA private key 304.

The CA private key 304 is used to sign (at 370, 372, 374) a root certificate 306, the attribute certificate 118, and the device certificate 120. The signing (at 370) of the root certificate 306 produces a root certificate signature 308 that is part of the root certificate 306, the signing (at 372) of the attribute certificate 118 produces an attribute certificate signature 310 that is part of the attribute certificate 118, and the signing (at 374) of the device certificate 120 produces a device certificate signature 312 that is part of the device certificate 120. The signing of the attribute certificate 118 and the device certificate 120 by the CA 302 establishes trust of the attribute certificate 118 and the device certificate 120.

The attribute certificate 118 includes an attribute list 314, which contains various attributes. The attributes can include a golden platform data measurement value (e.g., a hash value) derived based on measuring the platform data portions at the time of manufacture or assembly of the electronic module 104. The attributes also include a golden component measurement value (e.g., a hash value) derived based on the component identifiers 115A to 115B at the time of manufacture or assembly of the electronic module 104. The golden measurement values in the attribute certificate 118 are compared to measurement values calculated for the authentication of the platform data 110 and the electronic components 114A to 114B of the electronic module 104.

In some examples, the attributes included in the attribute list 314 are defined by object identifiers (OIDs) that may be published to a dictionary (or other data structure) available at a public site. The dictionary is a public way to allow a manufacturer of the electronic module 104 to specify what is in the attribute list 314 of the attribute certificate 118.

The attribute certificate 118 further includes an attribute certificate serial number 320 which identifies the attribute certificate 118. In other examples, another type of attribute certificate identifier can be included in the attribute certificate 118.

The device certificate 120 includes a public key 322 and a private key 324 of the electronic module 104. The public key 322 and the private key 324 form a public-private key pair.

As shown in FIG. 3, the private key 324 of the device certificate 120 is used by the controller 132 in the electronic module 104 to sign (at 376) a challenge response 330, such as by using a selected signature algorithm negotiated between the secure access logic 108 and the electronic module 104. The signing of the challenge response 330 produces a signature 332 that is part of the challenge response 330. The challenge response 330 is an example of the challenge response sent at 242 in FIG. 2. The public key 322 of the device certificate 120 can be shared with the secure access logic 108 of FIG. 1 (such as at 230 in FIG. 2). The public key 322 can be used to decrypt the signed challenge response 330 so that the content (e.g., including the nonces and message digest M1) of the challenge response 330 can be extracted by the secure access logic 108.

In some examples, it may be possible to update the platform data 110 after deployment of the electronic module 104 in the field (e.g., a manufacturer has completed the manufacture or assembly of the electronic module 104 and has shipped the electronic module 104 to a customer to include in the compute platform 102). The platform data 110 can be updated in a secure session. For example, a management entity (a human, a program, or a machine) can connect to the electronic module 104, and establish a secure session that is protected against an unauthorized attack. In the secure session, the management entity updates the platform data 110 stored in the memory 112 of the electronic module 104. In the secure session, the management entity also applies a measurement on portions of the updated platform data to produce an updated platform data measurement value.

In response to the update of the platform data 110, the management entity can generate an update (Delta) attribute certificate 340 that includes an attribute list 342 containing one or more updated attributes, including the updated platform data measurement value. If the electronic components 114A to 114B have also been modified (such as by swapping one electronic component with another electronic component), an updated component measurement value can be computed by the management entity based on the changed component identifiers. The management entity can add the updated component measurement value to the attribute list 342 of the update attribute certificate 340.

The update attribute certificate 340 contains an attribute certificate serial number 344 (or another type of identifier) that is equal to the attribute certificate serial number 320 of the attribute certificate 118. The inclusion of the attribute certificate serial number 320 in the update attribute certificate 340 allows the update attribute certificate 340 to be linked (at 378) to the attribute certificate 118.

In addition, the update attribute certificate 340 includes an update attribute certificate serial number (or another type of identifier) that identifies the update attribute certificate 340. The update attribute certificate 340 is signed with the private key 324 of the device certificate 120. This signing produces a signature 348 that is part of the update attribute certificate 340.

Along with the generation of the update attribute certificate 340, the management entity can also create an alias certificate 350, which is an updated version of the device certificate 120. Note that the update attribute certificate 340 and the alias certificate 350 are both part of the module certificate chain 116.

The alias certificate 350 includes a public key 352 and a private key 354 (which form a public-private key pair). The alias certificate 350 is signed (at 382) with the private key 324 of the device certificate 120, which produces a signature 356 that is part of the alias certificate 350.

After the alias certificate 350 has been created, the private key 354 of the alias certificate 350 is used to sign (at 384) a challenge response 360 to produce a signature 362. The public key 352 of the alias certificate 350 can be shared with the secure access logic 108 to allow the decryption of the signed challenge response 360 as part of a challenge procedure to validate communications with the electronic module 104.

Figure 4:
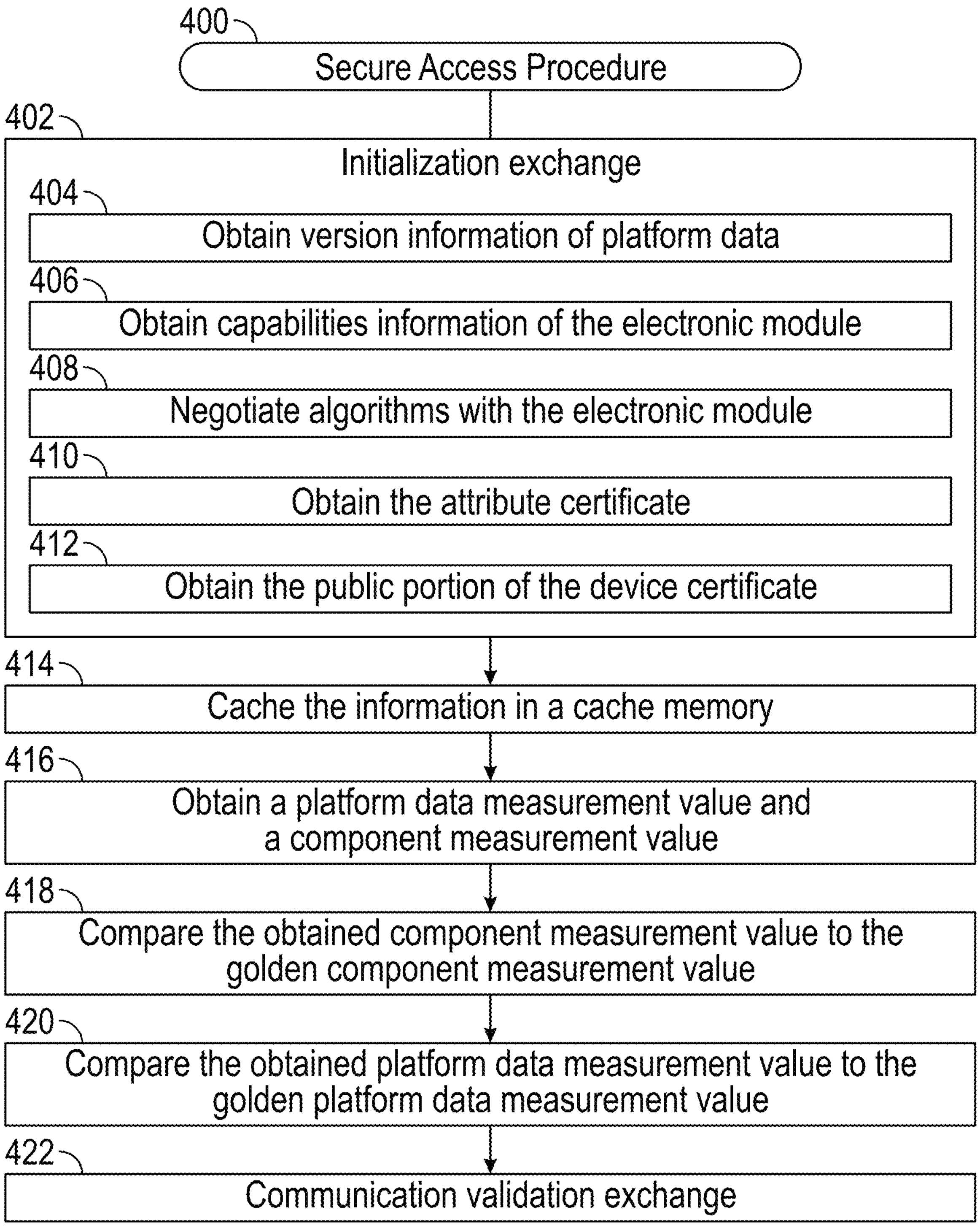
FIG. 4 is a flow diagram of a secure access procedure according to some examples.

FIG. 4 is a flow diagram of a secure access procedure 400 which can be performed by a requester such as the secure access logic 108 of FIG. 1. The secure access procedure 400 includes performing (at 402) an initialization exchange, such as the initialization exchange 202 of FIG. 2. The initialization exchange 402 includes obtaining (at 404) version information of the platform data 110, obtaining (at 406) capabilities information of the electronic module 104, and negotiating (at 408) algorithms (including a hash algorithm and a signature algorithm) between the secure access logic 108 and the electronic module 104. The tasks 404, 406, and 408 correspond to tasks 212, 214, 216, 218, 220, and 222 of FIG. 2.

The initialization exchange further includes obtaining (at 410) the attribute certificate, and obtaining (at 412) the public portion (e.g., the public key) of the device certificate.

In some examples, the secure access procedure 400 includes caching (at 414) the obtained version information, the negotiated hash algorithm and signature algorithm, the attribute certificate, and the public portion of the device certificate in a cache memory (e.g., 136 in FIG. 1). The cached information can be used in a subsequent access of the electronic module 104 by a requester such as the secure access logic 108.

The secure access procedure 400 further includes obtaining (at 416) a platform data measurement value and a component measurement value, such as according to tasks 232, 234, 236, and 238 of FIG. 2. As noted above in connection with FIG. 2, the platform data measurement value and the component measurement value can be computed by the secure access logic 108 (in the raw measurement mode) or by the electronic module 104 (in the non-raw measurement mode).

The secure access procedure 400 further includes comparing (at 418) the obtained component measurement value with a golden component measurement value retrieved from the attribute list (e.g., 314 or 342) of an attribute certificate (e.g., 118 or 340). If the obtained component measurement value matches the golden component measurement value in the attribute certificate, then that indicates that the electronic components 114A to 114B of the electronic module 104 have not been tampered with, and thus the electronic module 104 is authenticated. However, if the obtained component measurement value does not match the golden component measurement value, then that indicates tampering with the electronic components 114A to 114B, and the secure access logic 108 can take remediation action, such as by issuing an alert to a target entity, disabling the electronic module 104 or the compute platform 102, or another remediation action.

The secure access procedure 400 additionally includes comparing (at 420) the obtained platform data measurement value with a golden platform data measurement value retrieved from the attribute list (e.g., 314 or 342) of an attribute certificate (e.g., 118 or 340). If the obtained platform data measurement value matches the golden platform data measurement value, then that indicates that the platform data 110 has not been compromised (and thus is authenticated). On the other hand, if the obtained platform data measurement value does not match the golden platform data measurement value from the attribute certificate 118, then that indicates that the platform data 110 has been compromised. In response, the secure access logic 108 can take remediation action, such as by issuing an alert to a target entity, disabling the electronic module 104 or the compute platform 102, or another remediation action.

The secure access procedure 400 further includes performing (at 422) a communication validation exchange, such as the communication validation exchange 206 of FIG. 2 that includes the sending of a challenge to the electronic module 104 and receiving of a signed challenge response from the electronic module 104. As noted above, the secure access logic 108 can decrypt the signed challenge response to extract the content of the challenge response. The extracted content includes the nonces $n_0$ and $n_1$ as well as the message digest M1, for example. The nonces can be used by the secure access logic 108 to confirm that data received from the electronic module 104 is not a replay of prior data, which may be performed by a replay attack. The secure access logic 108 compares the message digest M1 from the challenge response to the message digest M0 (the expected digest) generated by the secure access logic 108. If the message digests M0 and M1 match, then that indicates the electronic module 104 is an expected source and the data received from the electronic module 104 has not been modified.

The secure access procedure 400 establishes that the electronic module 104 can be trusted based on authentication of the platform data 110 and the electronic components 114A to 114B of the electronic module 104. Additionally, the secure access logic 108 can confirm (based on use of the nonces $n_0$ and $n_1$) that accessed data from the electronic module 104 is fresh (i.e., the data is not a replay of prior data), transferred data from the electronic module 104 has not been modified (based on the secure access logic 108 being able to decrypt the signed challenge response), and the data originates from an expected source (the electronic module 104) based on a confirmation that the challenge response is signed with the private key of the electronic module 104.

At this point, a requester (different from the secure access logic 108), such as firmware or software executed on the processor 106 in the compute platform 102, can access data in the electronic module 104 for the use of the requester. The data in the electronic module 104 that is accessed can include SPD data, FRU data, data in memory devices, data in a register, data from a sensor, or any other type of data of the electronic module 104.

Figure 5:
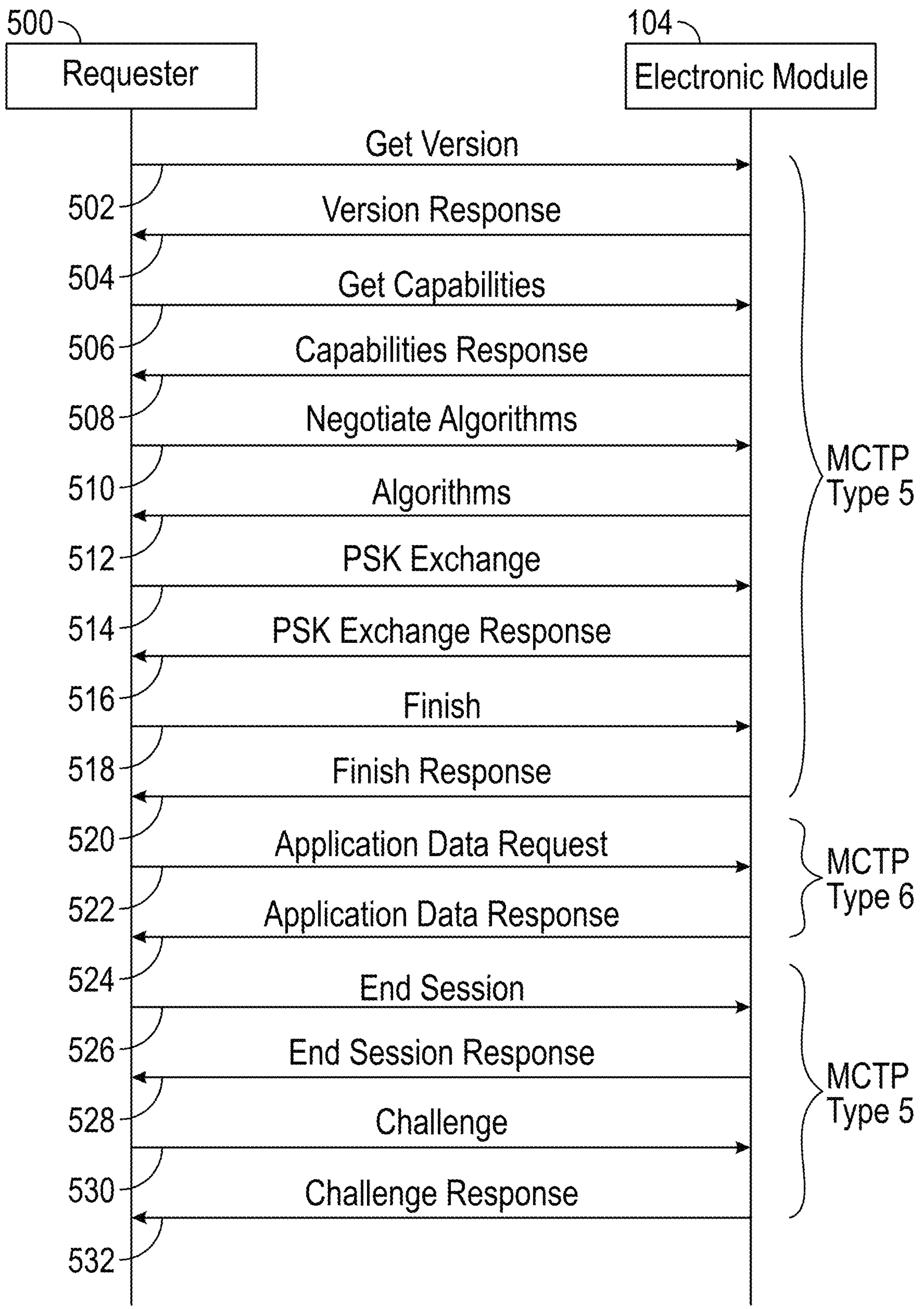
FIG. 5 is a flow diagram of an open data transfer process between a requester and an electronic module, according to some examples.

FIG. 5 is a flow diagram of an open data transfer process between a requester 500 and the electronic module 104, in which the data requested from the electronic module 104 is transferred in the open, i.e., unencrypted. This open data transfer process may be according to the SPDM secure session transfer in the open capability. Messages exchanged in FIG. 5 may be according to the SPDM standard and may be transferred over the communications link 134 of FIG. 5 using the MCTP transfer protocol.

In the data transfer process of FIG. 5, initialization tasks 502, 504, 506, 508, 510, and 512 are similar to respective tasks 212, 214, 216, 218, 220, and 222 of FIG. 2. It is noted that the requester 500 may cache the initialization information obtained according to the tasks 502, 504, 506, 508, 510, and 512 for use in a subsequent data transfer process (so that the tasks 502, 504, 506, 508, 510, and 512 can be skipped in the subsequent data transfer process).

After the initialization tasks, the requester 500 sends (at 514) a Pre-Shared Key (PSK) Exchange request to the electronic module 104. A PSK exchange sets up a PSK, which is a shared secret. In some examples according to FIG. 5, the PSK established in the PSK exchange is a null PSK, which indicates that encryption of data is not to be performed. In response to the PSK Exchange request, the electronic module 104 sends (at 516) a PSK Exchange Response to the requester 500 to complete the establishment of the PSK (in this case a null PSK).

After the PSK exchange, the requester 500 sends (at 518) a Finish request to the electronic module 104, which responds (at 520) with a Finish Response. This Finish exchange completes the establishment of a secure session between the requester 500 and the electronic module 104.

In some examples, the messages exchanged between the requester 500 and the electronic module 104 (at 502 to 520) can include MCTP Type 5 messages. MCTP defines various types of messages, with an MCTP Type 5 message being a message that is not exchanged in a secure session.

Once the secure session has been established following the Finish exchange (at 518 and 520), data transferred between the requester 500 and electronic module 104 can use MCTP Type 6 messages, which are secure messages sent using SPDM over MCTP. In the example of FIG. 5, the requester 500 sends (at 522) an Application Data Request (in an MCTP Type 6 message) to the electronic module 104. The Application Data Request is a request for data of the electronic module 104. For example, the Application Data Request can include an identifier specifying the data sought by the request. In response to the Application Data Request, the electronic module 104 retrieves the requested data and sends (at 524) an Application Data Response (in an MCTP Type 6 message) to the requester 500. The Application Data Response contains the requested data.

Note that it is possible for the requester 500 to send multiple Application Data Requests to the electronic module 104, which can respond with respective Application Data Responses.

To end the secure session, the requester 500 sends (at 526) an End Session request to the electronic module 104, which responds by sending (at 528) an End Session Response to the requester 500. Additionally, the requester 500 initiates a challenge process to validate the communications between the requester 500 and the electronic module 104, by sending (at 530) a challenge to the electronic module 104, which responds by sending (at 532) a signed challenge response to the requester 500. In some examples, the messages exchanged (at 526 to 532) can be MCTP Type 5 messages.

The requester 500 validates the signature in the signed challenge response, the requester 500 compares the message digest in the signed challenge response to an expected message digest. If the message digests match, the requester 500 has validated the communications between the requester 500 and the electronic module 104, and can confirm the data in one or more Application Data Responses is valid.

Figure 6:
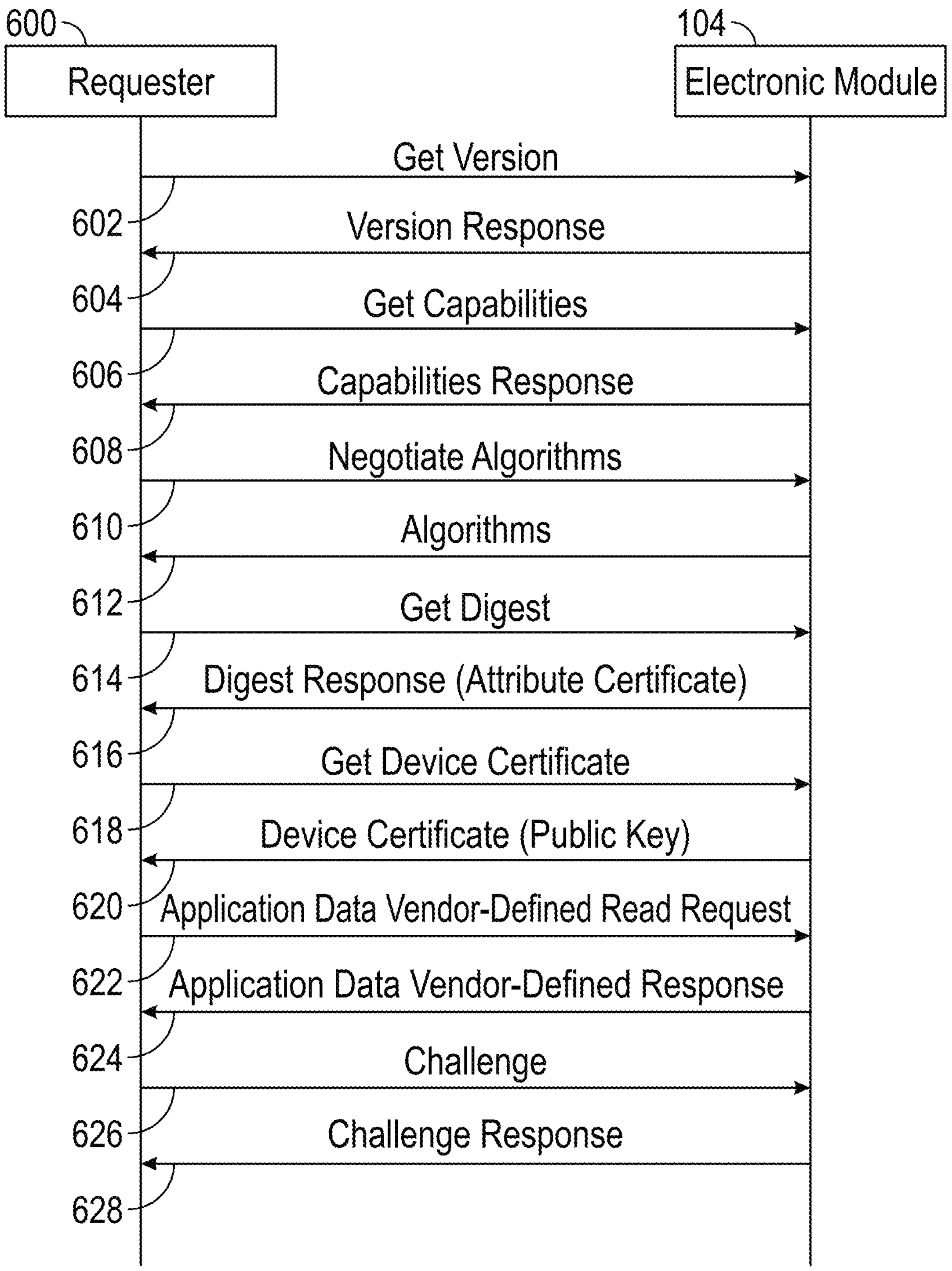
FIG. 6 is a flow diagram of a vendor-defined data transfer process between a requester and an electronic module, according to some examples.

FIG. 6 is a flow diagram of a vendor-defined data transfer process between a requester 600 and the electronic module 104. In FIG. 6, vendor-defined messages (VDMs) are used to request and transfer data to the electronic module 104. In some examples, a VDM is a type of MCTP message. A VDM refers to a message defined by a vendor identified using a vendor identifier. Different vendors (i.e., parties) can define different VDMs to use. Messages exchanged in FIG. 2 may be according to the SPDM standard and may be transferred over the communications link 134 of FIG. 5 using the MCTP transfer protocol.

Initialization tasks 602, 604, 606, 608, 610, 612, 614, 616, 618, and 620 of the vendor-defined data transfer process of FIG. 6 are similar to respective tasks 212, 214, 216, 218, 220, 222, 224, 226, 228, and 230 in FIG. 2.

After the initialization tasks, the requester 600 sends (at 622) an Application Data Vendor-Defined Read Request (in a VDM) to the electronic module 104. The Application Data Vendor-Defined Read Request is a request for data of the electronic module 104. In response to the Application Data Vendor-Defined Read Request, the electronic module 104 retrieves the requested data and sends (at 624) an Application Data Vendor-Defined Response (in a VDM) containing the requested data to the requester 600.

Note that it is possible for the requester 600 to send multiple Application Data Vendor-Defined Read Requests to the electronic module 104, which can respond with respective Application Data Vendor-Defined Responses.

In some examples, an Application Data Vendor-Defined Read Request is a message (e.g., an SPDM message) containing an opcode field set to a value that specifies that the message relates to a read operation. An "opcode" refers to a value that identifies an operation. Other examples of opcodes that can be included in opcode fields of VDMs (or more generally, in other types of messages) can include any or some combination of the following: an opcode specifying a write operation, an opcode specifying a protect operation (which identifies one or more memory regions containing data that is not allowed to be updated), an opcode specifying an unprotect operation (which identifies one or more previously protected memory regions that are to be unprotected and thus allowed to be updated), an opcode specifying a password write to write a password that is to be used to access one or more memory regions.

The requester 600 initiates a challenge process by sending (at 626) a challenge to the electronic module 104, which responds by sending (at 628) a signed challenge response to the requester 600. The challenge process is for validating the communications between the requester 600 and the electronic module 104.

It is noted that the requester 600 may cache the initialization information obtained according to the tasks 602, 604, 606, 608, 610, 612, 614, 616, 618, and 620 for use in a subsequent data transfer process (so that the tasks 602, 604, 606, 608, 610, 612, 614, 616, 618, and 620 can be skipped in the subsequent data transfer process).

Figure 7:
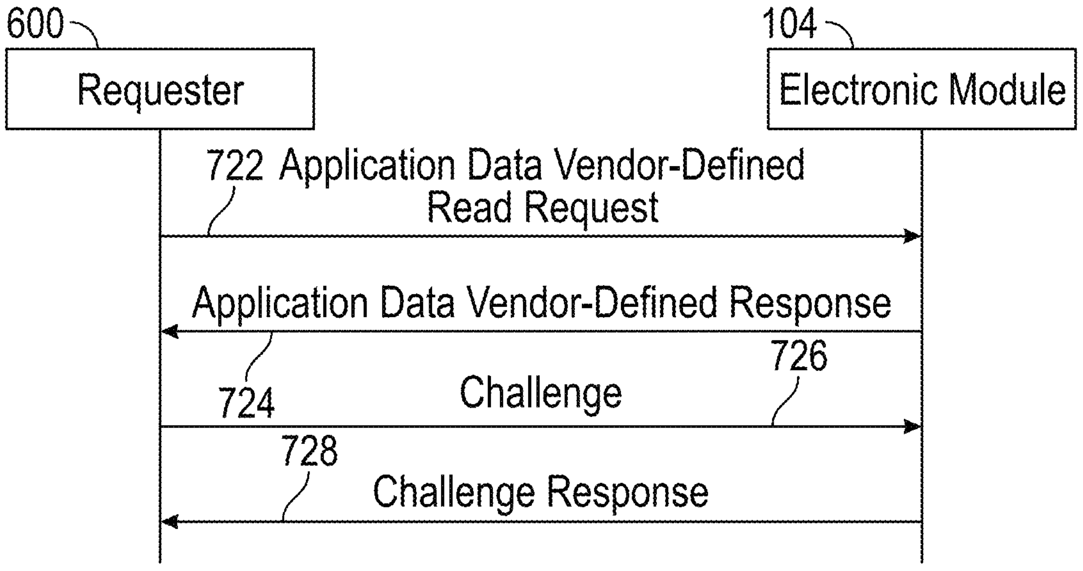
FIG. 7 and FIG. 8 are flow diagrams of abbreviated vendor-defined data transfer processes, according to some examples.

FIG. 7 shows an example of an abbreviated vendor-defined data transfer process between the requester 600 and the electronic module 104 in which tasks 602, 604, 606, 608, 610, 612, 614, 616, 618, and 620 can be omitted if the initialization information obtained by the requester 600 is cached, such as the cached initialization information 140 in the cache memory 136 of FIG. 1. In FIG. 7, tasks 722, 724, 726, and 728 are similar to respective tasks 622, 624, 626, and 628 of FIG. 6. The challenge and challenge response exchange at 726 and 728 allows the requester 600 to validate (attest) data sent by the electronic module 104.

Figure 8:
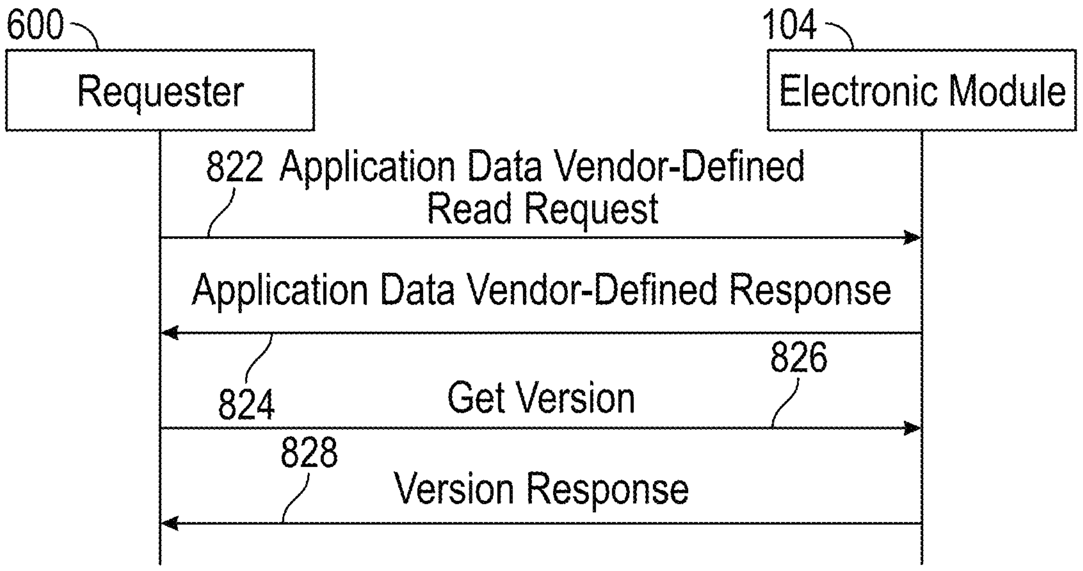

FIG. 8 shows an abbreviated vendor-defined data transfer process between the requester 600 and the electronic module 104 in which tasks 602, 604, 606, 608, 610, 612, 614, 616, 618, and 620 can be omitted. In FIG. 8, tasks 822 and 824 are similar to respective tasks 622 and 624 of FIG. 6. In FIG. 8, a challenge process is not initiated by the requester 600. Instead, the requester 600 sends (at 826) a Get Version request to the electronic module 104, which responds by sending (at 828) a Version Response. The exchange of messages at 826 and 828 is used to trigger the clearing of any message digests (e.g., M0 and M1) that may have been stored at the requester 600 and the electronic module 104.

Figure 9:
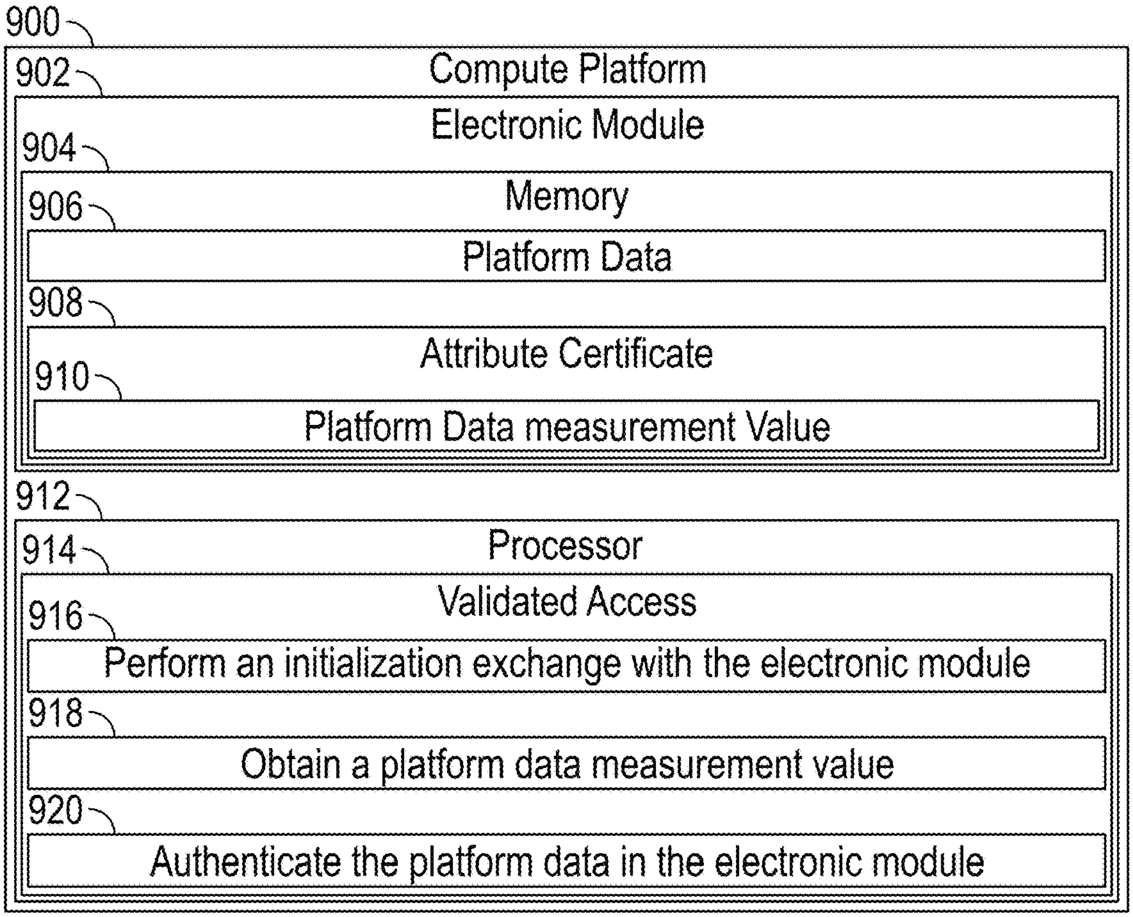
FIG. 9 is a block diagram of a compute platform according to some examples.

FIG. 9 is a block diagram of a compute platform 900. An example of the compute platform 900 is the compute platform 102 of FIG. 1. The compute platform 900 includes an electronic module 902 with a memory 904 that stores platform data 906 and an attribute certificate 908 containing a platform data measurement value 910 based on portions of the platform data 906 stored in respective memory regions of the memory 904 in the electronic module 902.

The compute platform 900 includes a processor 912 to perform validated access 914 of the electronic module 902. The validated access 914 includes performing (at 916) an initialization exchange with the electronic module 902 to retrieve initialization parameters, such as version information of the platform data 906, capabilities information of the electronic module 902, and negotiated algorithms such as a hash algorithm and a signature algorithm.

The validated access 914 includes obtaining (at 918) a platform data measurement value based on the platform data 906 in the electronic module 902. The obtaining of the platform data measurement value can include the processor 912 receiving the platform data 906 from the electronic module 902, and applying a measurement (e.g., a hash function) on the platform data to generate the platform data measurement value. Alternatively, the obtaining of the platform data measurement value can include the electronic module 902 generating the platform data measurement value, and sending the generated platform data measurement value to the processor 912.

The validated access 914 includes authenticating (at 920) the platform data in the electronic module based on the obtained platform data measurement value and the platform data measurement value contained in the attribute certificate. For example, the processor 912 can compare the obtained platform data measurement value to the platform data measurement value contained in the attribute certificate. The platform data measurement value contained in the attribute certificate can be a golden platform data measurement value generated at the time of manufacture or assembly of the electronic module 104.

In some examples, the platform data measurement value is based on a measurement of the portions of the platform data according to a sequence specified by a manifest (e.g., the manifest 142 of FIG. 1).

In some examples, the attribute certificate 908 further contains a component measurement value based on identifiers of components in the electronic module. The processor 912 can obtain a component measurement value based on the identifiers of the components in the electronic module 902, and verify that the components in the electronic module have not been modified based on the obtained component measurement value and the component measurement value in the attribute certificate 908.

In some examples, the attribute certificate 908 is part of a certificate chain of certificates in the compute platform 900. The certificate chain further includes a device certificate (e.g., 120 in FIG. 3) having a public key and a private key. The processor 912 can perform a communication validation process with the electronic component based on the public key and the private key in the device certificate. The communication validation process can include a challenge process in which the processor 912 sends a challenge to the electronic module 902, and receives a signed challenge response from the electronic module 902.

In some examples, the attribute certificate 908 and the device certificate are signed using a private key of a certificate authority.

In some examples, the processor 912 can detect a change in the platform data 906. The change is an intended change requested or required by a manufacturer of the electronic module 902, or by any other authorized entity. The processor 912 can generate an update (Delta) attribute certificate (e.g., 340 in FIG. 3) in response to detecting the change in the platform data 906. The update attribute certificate includes a measurement value based on portions of the changed platform data stored in respective memory regions of the memory 904 in the electronic module 902.

In some examples, the processor 912 can authenticate the changed platform data using the update attribute certificate.

In some examples, the attribute certificate 908 includes an identifier (e.g., a serial number) of the attribute certificate 908. The update attribute certificate also includes the identifier of the attribute certificate 908 to link the update attribute certificate with the attribute certificate 908.

In some examples, after the authenticating of the platform data 906, a requester can access the platform data 906 from the electronic module 902. The requester can validate a communication between the requester and the electronic module 902 based on a public key and a private key in a device certificate that is part of a certificate chain that further includes the attribute certificate 908.

In some examples, the access of the platform data 906 is part of an open secure session (e.g., according to FIG. 5) in which the platform data 906 is transferred unencrypted between the requester and the electronic module 902.

In some examples, the access of the platform data 906 uses (VDMs) including a request message sent from the requester to the electronic module 902, and a response message from the electronic module 902 to the requester. Examples of such access are shown in FIGS. 6-8.

In some examples, the processor 912 can store, in a cache memory, initialization parameters exchanged between the requester and the electronic module as part of establishing a session between the requester and the electronic module. Examples of the initialization parameters include version information of the platform data 906, capabilities information of the electronic module 902, and negotiated algorithms. A subsequent access of the platform data 906 can use the initialization parameters in the cache memory.

In some examples, the processor 912 can set, in a message, a value in an opcode field to protect a portion of the platform data or to set a password for access of the portion of the platform data.

Figure 10:
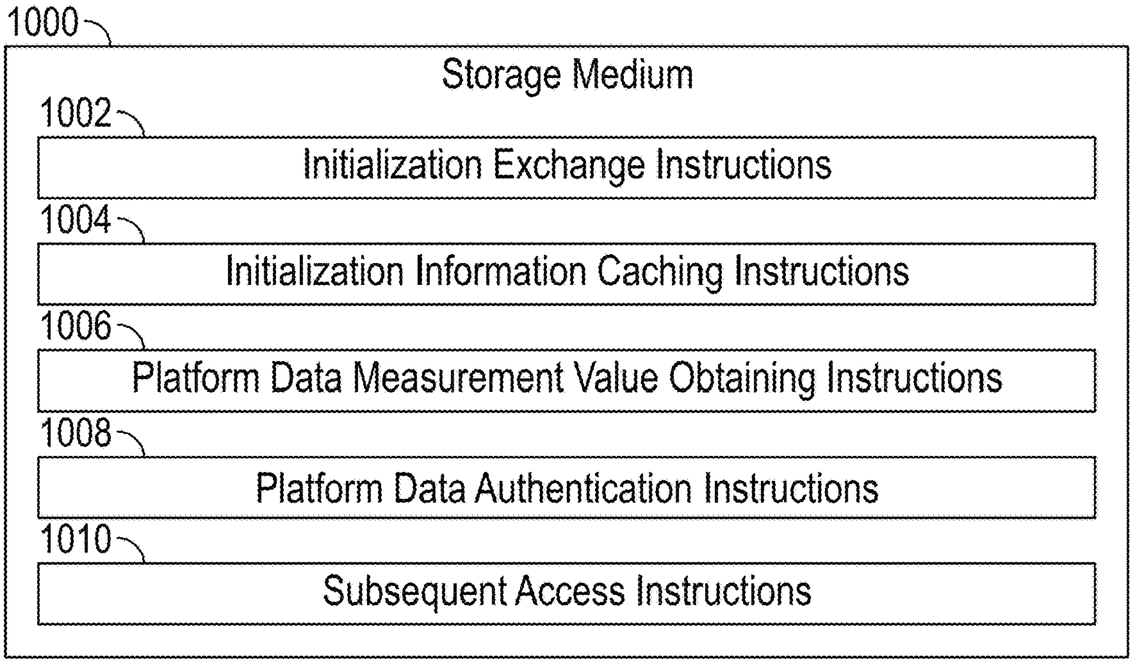
FIG. 10 is a block diagram of a storage medium storing machine-readable instructions according to some examples.

FIG. 10 is a block diagram of a non-transitory machine-readable or computer-readable storage medium 1000 storing machine-readable instructions that upon execution cause a processor of a compute platform to perform various tasks.

The machine-readable instructions include initialization exchange instructions 1002 to perform an initialization exchange with the electronic module to obtain initialization information from an electronic module. The initialization information includes information relating to a measurement algorithm to use for measuring information, as well as other information, such as a signature algorithm.

The machine-readable instructions include initialization information caching instructions 1004 to cache the initialization information in a cache memory. An example of the cache memory is depicted as 136 in FIG. 1.

The machine-readable instructions include platform data measurement value obtaining instructions 1006 to obtain a platform data measurement value derived using the measurement algorithm based on platform data in the electronic module. The measurement algorithm can be a hash algorithm, for example.

The machine-readable instructions include platform data authentication instructions 1008 to authenticate the platform data in the electronic module based on the obtained platform data measurement value and a platform data measurement value contained in an attribute certificate retrieved by the processor from the electronic module.

The machine-readable instructions include subsequent access instructions 1010 to use the cached initialization information in a subsequent access of the electronic module (an access that occurred after the initialization exchange has been performed). By using the cached initialization information, an initialization exchange can be avoided in the subsequent access of the electronic module.

Figure 11:
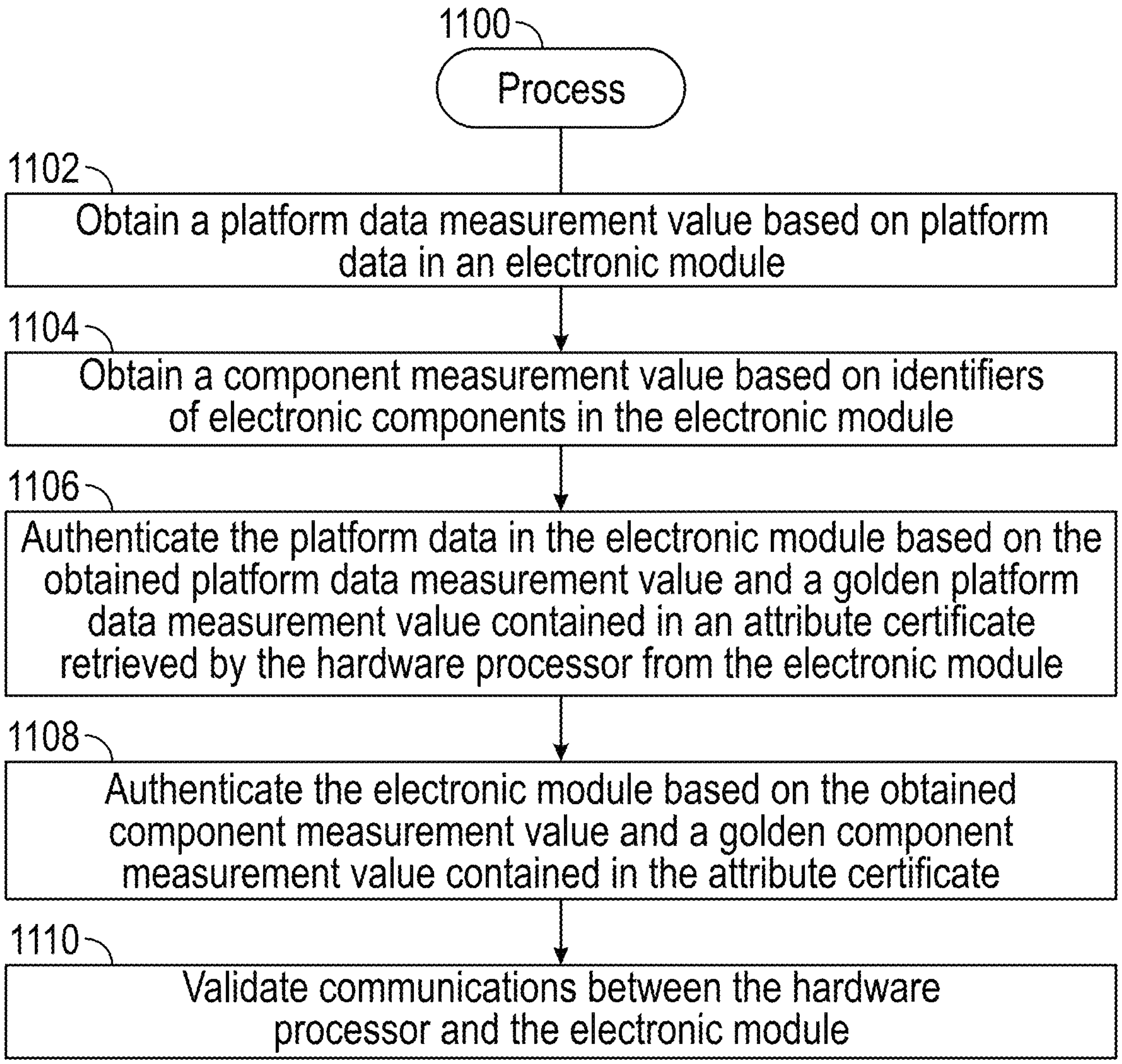
FIG. 11 is a flow diagram of a process according to some examples.

FIG. 11 is a flow diagram of a process 1100 according to some examples. The process 1100 can be performed in a compute platform (e.g., 102 in FIG. 1), for example.

The process 1100 includes obtaining (at 1102), by a hardware processor, a platform data measurement value based on platform data in an electronic module. The platform data measurement value can be generated by the hardware processor or by the electronic module.

The process 1100 includes obtaining (at 1104), by a hardware processor, a component measurement value based on identifiers of electronic components in the electronic module. The component measurement value can be generated by the hardware processor or by the electronic module.

The process 1100 includes authenticating (at 1106), by the hardware processor, the platform data in the electronic module based on the obtained platform data measurement value and a golden platform data measurement value contained in an attribute certificate retrieved by the hardware processor from the electronic module. The hardware processor can compare the obtained platform data measurement value to the golden platform data measurement value.

The process 1100 includes authenticating (at 1108), by the hardware processor, the electronic module based on the obtained component measurement value and a golden component measurement value contained in the attribute certificate. The hardware processor can compare the obtained component measurement value to the golden component measurement value.

The process 1100 includes validating (at 1110), by the hardware processor, communications between the hardware processor and the electronic module. The validation can be based on a challenge process, for example.

As used here, a "computer" can refer to any or some combination of the following: a desktop computer, a notebook computer, a tablet computer, a server computer, a vehicle, a household appliance, a communication node, a storage system, or any other type of electronic device.

A "memory device" can refer to any or some combination of the following: a dynamic random access memory (DRAM) device, a static random access memory (SRAM) device, a flash memory device, an erasable and programmable read-only memory (EPROM), an electrically erasable and programmable read-only memory (EEPROM), or another type of memory device.

As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

A hardware processor can include a microprocessor, a core of a multi-core microprocessor, a microcontroller, a programmable integrated circuit, a programmable gate array, or another hardware processing circuit.

A TPM can perform security tasks, including cryptographic operations. The TPM has physical security mechanisms that protect the TPM against unauthorized access, such as access by malicious programs.

A BMC can refer to a specialized service controller that monitors the physical state of a compute platform using sensors and communicates with a remote management system (that is remote from the compute platform) through an independent "out-of-band" connection. The BMC can perform management tasks to manage components of the compute platform. Examples of management tasks that can be performed by the BMC can include any or some combination of the following: power control to perform power management of the compute platform (such as to transition the compute platform between different power consumption states in response to detected events), thermal monitoring and control of the compute platform (such as to monitor temperatures of the compute platform and to control thermal management states of the compute platform), fan control of fans in the compute platform, system health monitoring based on monitoring measurement data from various sensors of the compute platform, remote access of the compute platform (to access the compute platform over a network, for example), remote reboot of the compute platform (to trigger the compute platform to reboot using a remote command), system setup and deployment of the compute platform, system security to implement security procedures in the compute platform, and so forth.

In some examples, the BMC can provide so-called "lights-out" functionality for a compute platform. The lights out functionality may allow a user, such as a systems administrator, to perform management operations on the compute platform even if an OS is not installed or not functional on the compute platform.

Moreover, in some examples, the BMC can run on auxiliary power provided by an auxiliary power supply (e.g., a battery); as a result, the compute platform does not have to be powered on to allow the BMC to perform the BMC's operations. The auxiliary power supply is separate from a main power supply that supplies powers to other components (e.g., a main processor, a memory, an input/output (I/O) device, etc.) of the compute platform.

Each of FIGS. 2, 3-8, and 11 shows a specific order of tasks. In other examples, the tasks can be performed in a different order, some of the tasks may be omitted, and other tasks may be added.

A storage medium (e.g., 1000 in FIG. 10) can include any or some combination of the following: a semiconductor memory device such as a DRAM or SRAM, an EPROM, an EEPROM, or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A compute platform comprising:

an electronic module comprising a memory storing platform data, and an attribute certificate containing a platform data measurement value based on portions of the platform data stored in respective memory regions of the memory in the electronic module; and a processor to perform validated access of the electronic module based on:

performing an initialization exchange with the electronic module, obtaining a platform data measurement value based on the platform data in the electronic module, and authenticating the platform data in the electronic module based on the obtained platform data measurement value and the platform data measurement value contained in the attribute certificate.

2. The compute platform of claim 1, wherein the platform data measurement value is based on a measurement of the portions of the platform data according to a sequence specified by a manifest.

3. The compute platform of claim 2, wherein the manifest identifies the portions of the platform data to measure.

4. The compute platform of claim 1, wherein the attribute certificate further contains a component measurement value based on identifiers of components in the electronic module, and wherein the processor is to:

obtain a component measurement value based on the identifiers of the components in the electronic module, and verify that the components in the electronic module have not been modified based on the obtained component measurement value and the component measurement value in the attribute certificate.

5. The compute platform of claim 1, wherein the attribute certificate is part of a certificate chain of certificates in the compute platform, and the certificate chain further comprises a device certificate comprising a public key and a private key, and wherein the processor is to:

perform a communication validation process with the electronic module based on the public key and the private key in the device certificate.

6. The compute platform of claim 5, wherein the attribute certificate and the device certificate are signed using a private key of a certificate authority.

7. The compute platform of claim 5, wherein the processor is to:

detect a change in the platform data, and generate an update attribute certificate in response to detecting the change in the platform data, wherein the update attribute certificate comprises a measurement value based on portions of the changed platform data stored in respective memory regions of the memory in the electronic module.

8. The compute platform of claim 7, wherein the processor is to authenticate the changed platform data using the update attribute certificate.

9. The compute platform of claim 7, wherein the attribute certificate comprises an identifier of the attribute certificate, and wherein the update attribute certificate comprises the identifier of the attribute certificate to link the update attribute certificate with the attribute certificate.

10. The compute platform of claim 1, wherein after the authenticating of the platform data, a requester is to;

access the platform data from the electronic module, and validate a communication between the requester and the electronic module based on a public key and a private key in a device certificate that is part of a certificate chain that further includes the attribute certificate.

11. The compute platform of claim 10, wherein the access of the platform data is part of an open secure session in which the platform data is transferred unencrypted between the requester and the electronic module.

12. The compute platform of claim 10, wherein the access of the platform data uses vendor-defined messages (VDMs) including a request message sent from the requester to the electronic module, and a response message from the electronic module to the requester.

13. The compute platform of claim 10, wherein the requester is to:

store, in a cache memory, initialization parameters exchanged between the requester and the electronic module as part of establishing a session between the requester and the electronic module, wherein a subsequent access of the platform data uses the initialization parameters in the cache memory.

14. The compute platform of claim 1, wherein the processor is to:

set, in a message, a value in an opcode field to protect a portion of the platform data or to set a password for access of the portion of the platform data.

15. The compute platform of claim 1, wherein the electronic module comprises:

a memory module, and the platform data comprises serial presence detect (SPD) data, or a field replaceable unit (FRU) module, and the platform data comprises FRU data.

16. The compute platform of claim 1, wherein the platform data comprises product data of the compute platform, the product data including information for hardware and machine-readable instructions in the compute platform.

* * * * *